United States Patent
Gross et al.

(10) Patent No.: US 12,085,438 B2
(45) Date of Patent: Sep. 10, 2024

(54) INTERFACE SENSOR AND OPERATING METHOD OF AN INTERFACE SENSOR

(71) Applicant: Endress+Hauser Conducta GmbH+Co. KG, Gerlingen (DE)

(72) Inventors: Benjamin Gross, Pforzheim (DE);
Judith Raupp, Stuttgart (DE);
Benjamin Bertsch, Gerlingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 112 days.

(21) Appl. No.: 17/809,308

(22) Filed: Jun. 28, 2022

(65) Prior Publication Data

US 2023/0003572 A1    Jan. 5, 2023

(30) Foreign Application Priority Data

Jun. 30, 2021    (DE) .......................... 102021116911.9

(51) Int. Cl.
*G01F 23/296* (2022.01)
*G01B 17/02* (2006.01)

(52) U.S. Cl.
CPC .......... *G01F 23/296* (2013.01); *G01B 17/02* (2013.01)

(58) Field of Classification Search
CPC ... G01F 23/296; G01F 23/2962; G01B 17/02; G01B 15/02; C02F 3/12
See application file for complete search history.

(56) References Cited

U.S. PATENT DOCUMENTS

| 4,439,845 A | 3/1984 | Geohegan, Jr. et al. |
| 6,898,151 B1 | 5/2005 | Lyon |
| 10,137,388 B2 * | 11/2018 | Wright ................. B01D 21/305 |

(Continued)

FOREIGN PATENT DOCUMENTS

| CN | 111499027 A * | 8/2020 | |
| DE | 10309861 A1 * | 9/2004 | ......... G01F 23/2962 |

(Continued)

OTHER PUBLICATIONS

CN-111499027-A (attached machine translation) (Year: 2020).*

(Continued)

*Primary Examiner* — Yuqing Xiao
*Assistant Examiner* — Christopher Richard Walker
(74) *Attorney, Agent, or Firm* — Christopher R. Powers; Endress+Hauser (USA) Holding, Inc.

(57) ABSTRACT

The present disclosure includes an interface sensor for a sedimentation plant, the interface sensor including: a sound emitter configured for generating at least one first acoustic signal with a first frequency and for generating a second acoustic signal with a second frequency different from the first frequency; a sound detector configured for detecting at least one first signal response of the first acoustic signal and a second signal response of the second acoustic signal; and a control unit, wherein the control unit is connected to the sound emitter and the sound detector and is configured to evaluate the first signal response and the second signal response, to determine a floor distance, a sediment distance, a sediment thickness and a water level distance based on the first signal response and the second signal response, and to determine a water level based on the floor distance and the water level distance.

15 Claims, 4 Drawing Sheets

(56) References Cited

U.S. PATENT DOCUMENTS

2003/0038080 A1\* 2/2003 Vriens .................... C02F 3/121
 210/605
2009/0290452 A1 11/2009 Lyon

FOREIGN PATENT DOCUMENTS

| GB | 2374297 A \* | 10/2002 | ......... B01D 21/0006 |
|----|---|---|---|
| JP | 60192281 A | 9/1985 | |
| JP | 61007422 A | 1/1986 | |
| JP | 2001137835 A | 5/2001 | |
| JP | 5786043 B2 | 9/2015 | |
| KR | 20020034571 A \* | 5/2002 | |
| KR | 102170964 B1 \* | 10/2020 | |
| KR | 102257907 B1 \* | 5/2021 | |
| WO | WO-2017086150 A1 \* | 5/2017 | ............. G01B 17/02 |
| WO | WO-2021099820 A1 \* | 5/2021 | |

OTHER PUBLICATIONS

WO-2017086150-A1 (attached machine translation) (Year: 2017).\*
KR-102170964-B1 (attached machine translation) (Year: 2020).\*
KR-20020034571-A (attached machine translation) (Year: 2002).\*
DE-10309861-A1 (attached machine translation) (Year: 2004).\*
KR-102257907-B1 (attached machine translation) (Year: 2021).\*
WO-2021099820-A1 (attached machine translation) (Year: 2021).\*

\* cited by examiner

INTERFACE SENSOR AND OPERATING METHOD OF AN INTERFACE SENSOR

CROSS-REFERENCE TO RELATED APPLICATION

The present application is related to and claims the priority benefit of German Patent Application No. 10 2021 116 911.9, filed on Jun. 30, 2021, the entire contents of which are incorporated herein by reference.

TECHNICAL FIELD

The present disclosure relates to an operating method of an interface sensor, an interface sensor, a sedimentation plant, and an automatic control method of a sedimentation plant.

BACKGROUND

To detect interfaces in containers that are filled with liquids, interface sensors that emit acoustic signals are used. For this purpose, these sensors are immersed in the liquid. These acoustic signals propagate in the liquid and are reflected back to the sensor upon impinging upon an interface in the liquid or in the container, for example, consisting of solid particles.

The emission and detection of the acoustic signals normally takes place in the vertical direction relative to the container floor. Depending on requirements, the sensor should calculate the height of the interface above the container floor or the interface depth relative to a reference point, normally the water surface.

For this purpose, known sensors first determine the distance between sensor and interface on the basis of the parameters—e.g., "tank depth" and "immersion depth of the sensor in the liquid"—that are manually input by the user into the sensor. The parameters "tank depth" and "immersion depth of the sensor" must thus be determined on-site by the user for each sensor beforehand.

This manual parameter determination and parameter input by the user is linked with a great deal of work, in particular if a plurality of sensors are used. Likewise, it is not simple for the user to determine the "immersion depth" parameter exactly manually. In addition, such a sensor is suitable only for applications in which the fill level of the liquid in the container, i.e., the immersion depth, does not vary. A use of these sensors for applications, such as what are known as "sequencing batch reactors," with varying fill level is thus not possible.

It is therefore an object of the present disclosure to propose a method which enables a reliable, convenient, and versatile use of an interface sensor.

SUMMARY

This object is achieved by an operating method of an interface sensor according to the present disclosure.

An operating method according to the present disclosure comprises the following steps: arrangement of an interface sensor with a sound emitter, a sound detector and a control unit in a container, which is filled with a measurement medium such that the interface sensor is in contact with the measurement medium, wherein the interface sensor is aligned in the direction of a sediment layer in the container; emission of a first acoustic signal with a first frequency by the sound emitter; detection by the sound detector of a first signal response of the first acoustic signal; emission by the sound emitter of a second acoustic signal with a second frequency different from the first frequency; detection by the sound detector of a second signal response of the second acoustic signal; evaluation by the control unit of the first signal response and the second signal response; determination by the control unit of a floor distance and a sediment distance of the interface sensor, on the basis of the evaluation step; determination by the control unit of a sediment thickness on the basis of the floor distance and the sediment distance; and outputting of the sediment thickness by the control unit.

Using the operating method according to the present disclosure, it is enabled that the "tank depth" and "immersion depth" parameters no longer need to be determined by the user. A fluctuating immersion depth is detected by the interface sensor and enables a highly accurate measurement value calculation. The interface sensor is capable of calculating the fill level in the container, e.g., the water level. By evaluating the change in fill level or the rate of change, the quantity flowing into the container and the quantity discharging from the container can be calculated. The interface sensor thus supplies a continuous fill level measurement value. The interface sensor can thus be used as a proportional element of automatic control engineering.

According to an embodiment of the present disclosure, the operating method further comprises a step of determining a water level distance of the interface sensor by the control unit on the basis of the step of evaluating the first signal response and the second signal response, as well as a step of determination of a water level by the control unit on the basis of the floor distance and the water level distance, as well as a step of outputting the water level.

According to at least one embodiment of the present disclosure, the step of evaluating the first signal response and the second signal response comprises a subtraction of the first signal response from the second signal response and/or a low-pass filtering and an addition of the first signal response and the second signal response.

According to at least one embodiment of the present disclosure, the step of determining the sediment thickness comprises a subtraction of the determined sediment distance from the determined floor distance.

According to at least one embodiment of the present disclosure, the step of determining the water level distance comprises a subtraction of the first signal response and the second signal response.

The aforementioned object is further achieved by an interface sensor for a sedimentation plant according to the present disclosure. An interface sensor according to the present disclosure comprises: a sound emitter that is configured for generating at least one first acoustic signal with a first frequency and for generating a second acoustic signal with a second frequency different from the first frequency; a sound detector that is configured for detecting at least one first signal response of the first acoustic signal and a second signal response of the second acoustic signal; and a control unit, wherein the control unit is connected to the sound emitter and to the sound detector and is configured for evaluating the first signal response and the second signal response.

The aforementioned object is further achieved by a sedimentation plant according to the present disclosure. A sedimentation plant according to the present disclosure comprises: an interface sensor according to the present disclosure; a container for receiving a measurement medium, wherein the interface sensor is arranged relative to the container such that the interface sensor is configured for being immersed in the measurement medium; a measurement medium inlet for filling the container with measurement medium; a measurement medium outlet for discharging measurement medium from the container.

According to at least one embodiment of the present disclosure, the measurement medium inlet has an inlet valve, and the measurement medium outlet has a drain valve, wherein the sedimentation plant further has an automatic control unit, and the automatic control unit is connected to the inlet valve, the drain valve and the control unit of the interface sensor, and is configured for regulating the filling and emptying of the container with measurement medium.

According to at least one embodiment of the present disclosure, the sedimentation plant further comprises a gas inlet with a gas inlet valve for treating the measurement medium with gas, wherein the automatic control unit is connected to the gas inlet valve and is configured for regulating the treatment of the measurement medium with gas.

The aforementioned object is also achieved by an automatic control method according to the present disclosure. An automatic control method according to the present disclosure comprises the following steps: providing a sedimentation plant according to the present disclosure; operating the interface sensor according to the present disclosure; regulating the inlet valve and the drain valve depending on the water level determined by the interface sensor.

According to at least one embodiment of the present disclosure, the sedimentation plant has a gas inlet with a gas inlet valve for treating the measurement medium with gas, wherein the automatic control unit is connected to the gas inlet valve and is configured for regulating the treatment of the measurement medium with gas, wherein the automatic control method further comprises a step of treating of the measurement medium with gas by means of the gas inlet valve, wherein the treatment with gas is performed depending on the sediment thickness and/or the water level.

According to at least one embodiment of the present disclosure, the automatic control method further comprises a step of the determination of an operating state of the sedimentation plant by the control unit on the basis of the evaluation of the first signal response and/or the second signal response.

BRIEF DESCRIPTION OF THE DRAWINGS

The present disclosure is explained in more detail on the basis of the following description of figures. The following are shown.

DETAILED DESCRIPTION

Figure 1:
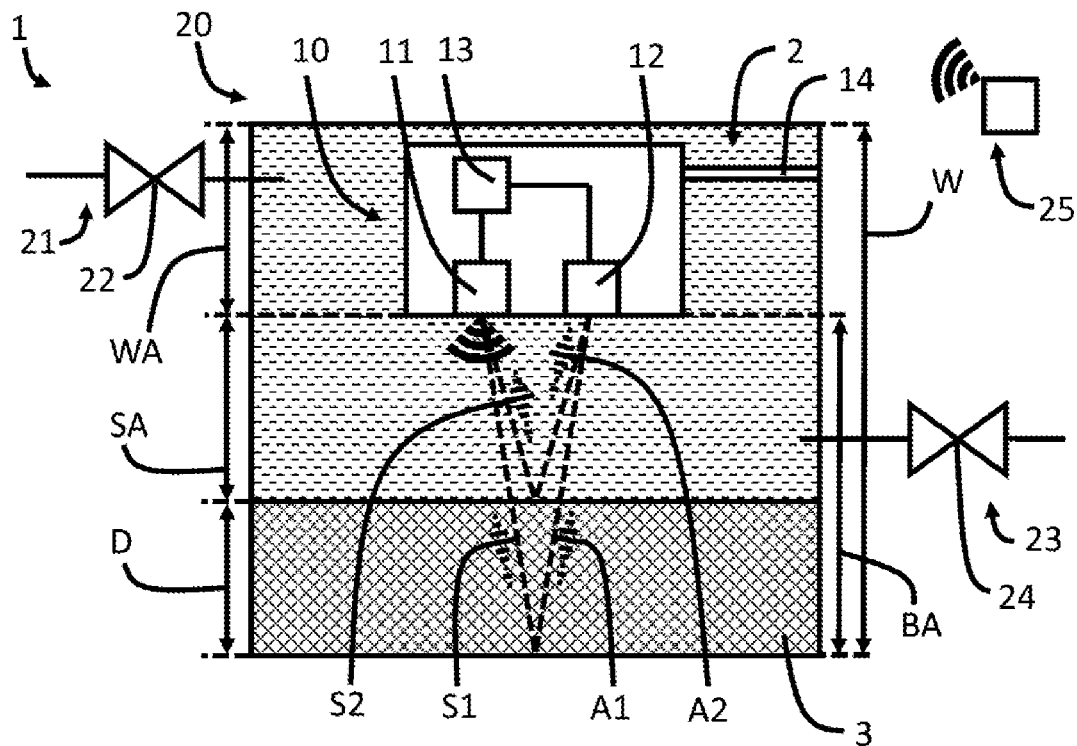
FIG. 1 shows a schematic representation of a sedimentation plant according to the present disclosure with an interface sensor according to the present disclosure.

FIG. 1 shows a sedimentation plant 1 according to the present disclosure with an interface sensor 10 according to the present disclosure. The sedimentation plant 1 is used, for example, in a wastewater (e.g., sewage) treatment plant.

The sedimentation plant 1 includes a container 20 for receiving a measurement medium 2. The container 20 is, for example, a sewage sludge basin or what is known as a "sequencing batch reactor" or another vessel. The container 20 is open at the top, for example, so that sewage gases can escape. The container 20 is suitably configured such that a sediment layer 3 is deposited by the measurement medium 2 on its floor or base. The sediment layer 3 is part of the measurement medium 2 and is produced, for example, by the sinking of heavy particles in the measurement medium 2, e.g., a decanting of the measurement medium 2.

The sedimentation plant 1 includes a measurement medium inlet 21. The measurement medium inlet 21 can be integrated into the container 20, as shown in FIG. 1 or, for example, can also be arranged above or in the container 20, for example, by means of a hose or the like, without contact with respect to the container 20 to supply the measurement medium 2 to the container 20. The measurement medium inlet 21 may include an inlet valve 22 for regulating the quantity of measurement medium 2 during the filling of the container 20 with measurement medium 2.

The sedimentation plant 1 further includes a measurement medium outlet 23. The measurement medium outlet 23 may be integrated into the container 20, for example, by means of a discharge pipe. However, the measurement medium outlet 23 can also be defined by the edge of the container 20, such that an overflow of the container 20 enables a discharge of measurement medium 2 from the container 20. A drain valve 24 may be arranged on the measurement medium outlet 23 to enable a regulation of the quantity of measurement medium 2 during the discharge of measurement medium 2.

Figure 2:
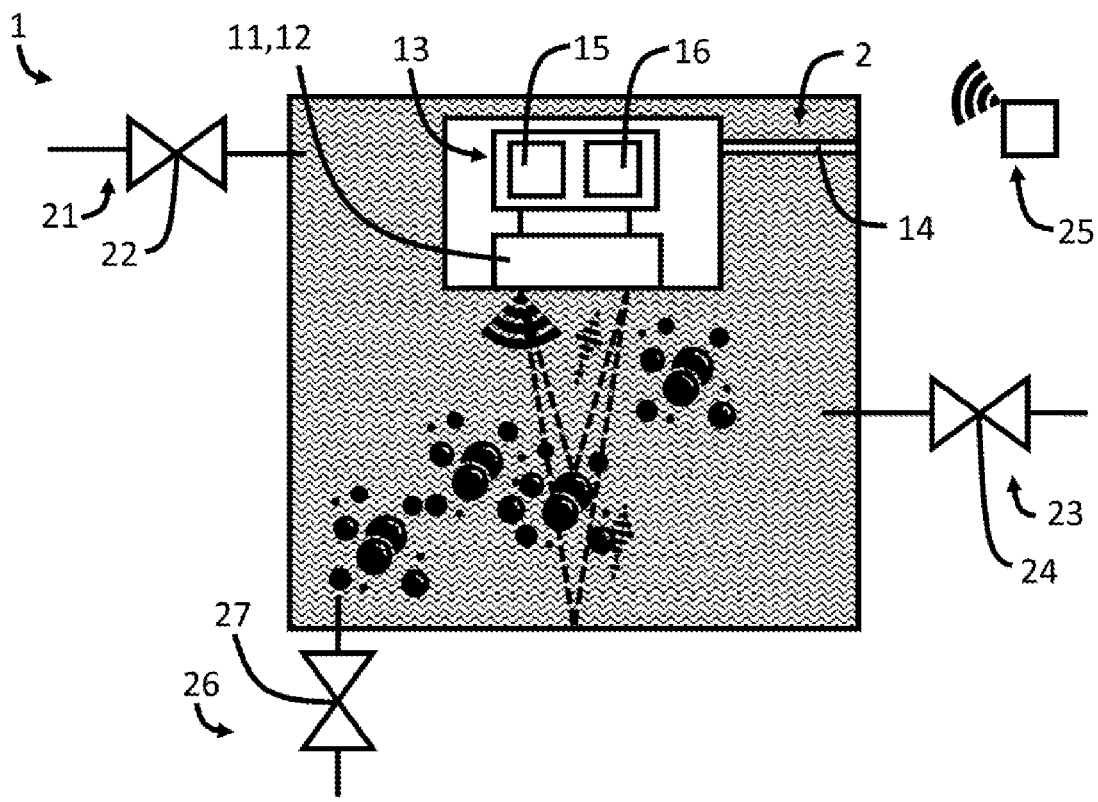
FIG. 2 shows a schematic representation of an alternative embodiment of a sedimentation plant with the interface sensor from FIG. 1.

As shown in FIG. 2, the sedimentation plant 1 may further include a gas inlet 26. The gas inlet 26 is, for example, integrated into the container 20, for example, by means of a pipe. However, the gas inlet 26 can also be configured as a gas line independent of the container 20, for example, by a hose or pipe inserted from above into the open-top container 20. The gas inlet 26 may include a gas inlet valve 27 to effect a regulation of the gas quantity introduced into the measurement medium 2. The gas inlet 26 is particularly advantageous if the sedimentation plant 1 is what is known as a "sequencing batch reactor."

According to at least one embodiment, which is compatible with all described embodiments, the sedimentation plant 1 may include, as shown in FIGS. 1 and 2, an automatic control unit 25 that is connected to the inlet valve 22 and the drain valve 24 and is configured for regulating the filling and emptying of the container 20 with measurement medium 2. The automatic control unit 25 is also connected to the gas inlet valve 27, in embodiments including the gas inlet valve 27, and is configured for regulating a gas flow at the gas inlet 26. The automatic control unit 25 is connected via a wired or wireless communication channel to the inlet valve 22, to the drain valve 24 and, if present, to the gas inlet valve 27. The automatic control unit 25 is configured for operating the sedimentation plant 1 as what is known as a "sequencing batch reactor," which will be discussed in detail further herein. The automatic control unit 25 may be also connected to the interface sensor 10 in order to control, for example, the inlet valve 22, the drain valve 24 and the gas inlet valve 27 depending on the interface sensor 10.

The terms water surface, water level and water level distance used in the following are to be understood to apply not only to water as the measurement medium but to all possible measurement media.

The interface sensor 10 includes a sound emitter 11, a sound detector 12 and a control unit 13. The sound emitter 11 and sound detector 12 can also be embodied in a common unit, e.g., as transceiver 11,12. In such an embodiment, the transceiver 11,12 therefore functions on the one hand as a sound emitter and on the other hand as a sound detector. If the sound emitter 11 or the sound detector 12 is mentioned in the following, the transceiver 11,12 is also meant at the same time. Of course, all embodiments can also be realized with a transceiver.

The sound emitter 11 and sound detector 12 are connected to the control unit 13. The interface sensor 10 may be fastened to the container 20 by means of a holder 14 or by another device, for example, a bridge (not shown) arranged above the container 20. The interface sensor 10 is thus fixedly arranged relative to the container floor. However, the interface sensor 10 can also be arranged to be moveable relative to the container 20 because the interface sensor 10 is configured for determining the floor distance BA and the water level distance WA itself.

According to a further embodiment (not shown), the interface sensor 10 can also be arranged to be floating or freely immersed in the measurement medium 2.

The sound emitter 11 is configured for generating at least one first acoustic signal S1 with a first frequency and for generating a second acoustic signal S2 with a second frequency different from the first frequency.

The sound detector 12 is configured for detecting at least one first signal response A1 which was initiated by the first acoustic signal S1, as well as a second signal response A2, which was initiated by the second acoustic signal S2. Of course, the sound detector 12 is also suitable for detecting signals with other frequencies. According to at least one embodiment, the sound detector 12 is structurally identical to the sound emitter 11. In such an embodiment, the sound detector 12 can also be used as a sound emitter 11 (see e.g., FIG. 2). According to such an embodiment, only one sound emitter 11 or sound detector 12 is thus necessary.

The control unit 13 is configured for controlling the sound emitter 11 such that the first acoustic signal S1 and/or the second acoustic signal S2 are generated. For example, the acoustic signals S1, S2 are thus controlled by means of the control unit 13 with respect to their time intervals, with respect to their amplitudes and with respect to their duration.

The first acoustic signal S1 is a low-frequency acoustic signal. The term "low frequency" is understood to mean a frequency lower than 300 kHz, for example, between 50 kHz and 200 kHz, particularly for example, between 80 kHz and 110 kHz. The first acoustic signal S1, due to its low frequency, can penetrate viscous fractions of the measurement medium 2 and/or deposits of the measurement medium 2, e.g., flocculations, or deposits of particles on the floor of the container 20. The first acoustic signal S1 is thus mainly reflected at the floor of the container 20.

The second acoustic signal S2 is a high-frequency acoustic signal. The term "high frequency" is understood to mean a frequency higher than 300 kHz, for example, between 500 kHz and 200 kHz, particularly for example, a frequency of 675 kHz. The second acoustic signal S2, due to its high frequency, is able to be reflected and absorbed at deposits, for example, a sediment layer 3. The second acoustic signal S2 is thus primarily reflected at the sediment layer 3.

Figure 3:
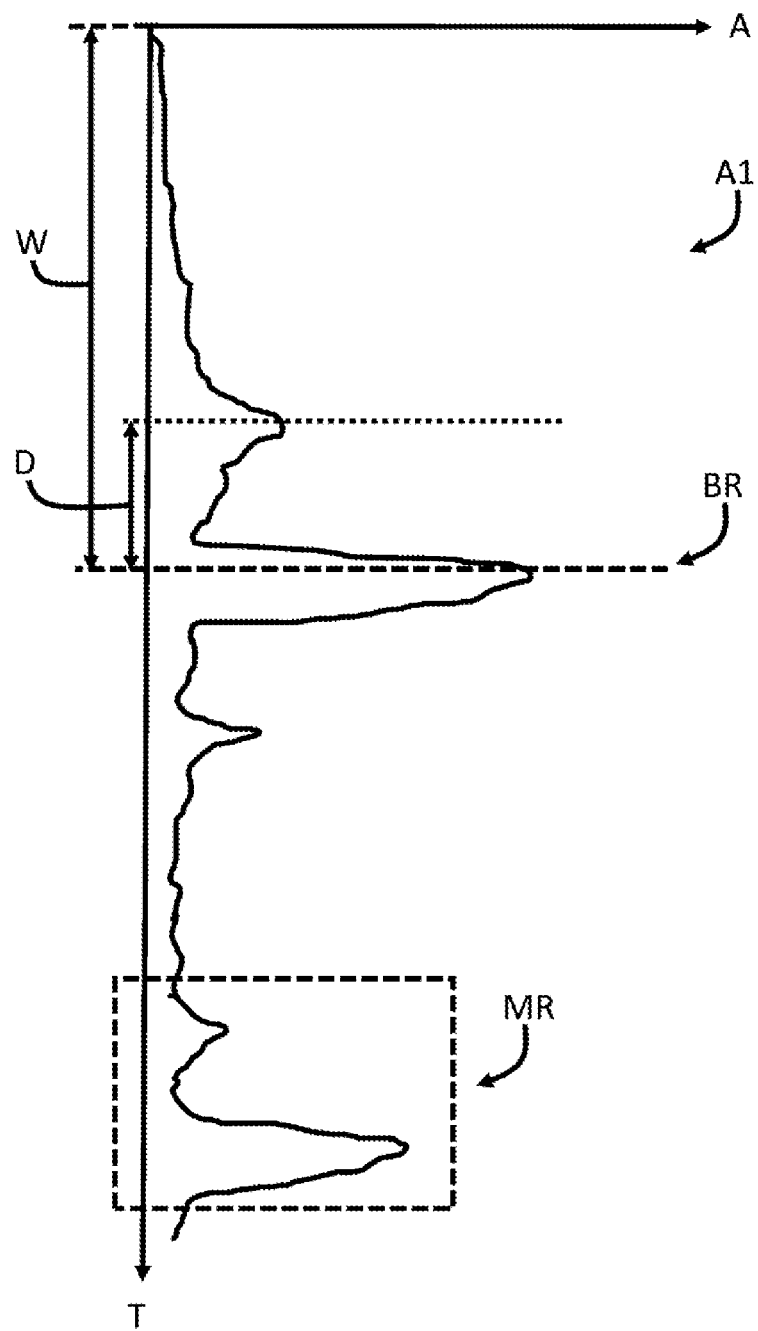
FIG. 3 shows a schematic representation of a first signal response detected by an interface sensor according to the present disclosure.

FIG. 3 shows a schematic representation of a first signal response A1 detected by the sound detector 12. The amplitude A can be read off on the abscissa, and the transit time T of the signal response A1 can be read off on the ordinate T. On the basis of the signal response A1, the control unit 13 determines the floor distance BA between the interface sensor 10 and the floor of the container 20, as well as the water level distance WA between the interface sensor 10 and the water level W of the measurement medium 2. The first signal response A1 has a large amplitude A at the container floor, since the low-frequency first acoustic signal S1 is poorly absorbed and reflected by the sediment layer 3 in the measurement medium 2. The component of the signal response A1 which has the greatest amplitude is thus reflected at the container floor. The distance to the container floor, that is to say the floor distance BA, is thus determined using the transit time up to the greatest amplitude and the speed of sound. The container floor is indicated in FIG. 3 by a horizontal dashed line. The beginning of the sediment layer 3 is represented by a horizontal dotted line. All signal components of the first signal response A1, which are measured chronologically after the point in time (dashed horizontal line in FIG. 3) which corresponds to the container floor, are further reflection and multiple-reflection signals. A detail of a multiple reflection MR is respectively shown schematically in FIGS. 3 and 4 by a dashed-line frame. A repetition of the portion of the signal response, which represents the sediment layer beginning and the container floor, can be seen here. These further reflection signals occur, for example, at the water surface, at the sediment layer, or at the container floor.

The water level distance WA can be determined using the reflection signals. In FIG. 3, a second floor reflection BR is schematically illustrated by the first acoustic signal S1 reflected at the surface of the water and finally again at the floor of the container 20. The framed detail of the multiple reflection MR unambiguously shows a correlation with the two signal peaks detected earlier in time, which represent the beginning of the sludge view (dotted line) and the floor of the container (dashed line). The offset in the transit time of the two correlated signal sections occurs due to the longer signal path (emitter to floor, floor to water surface, water surface to floor, floor to detector). The height of the water column above the sensor, i.e., the water level distance WA, can thus be determined from the difference in the transit time.

Figure 4:
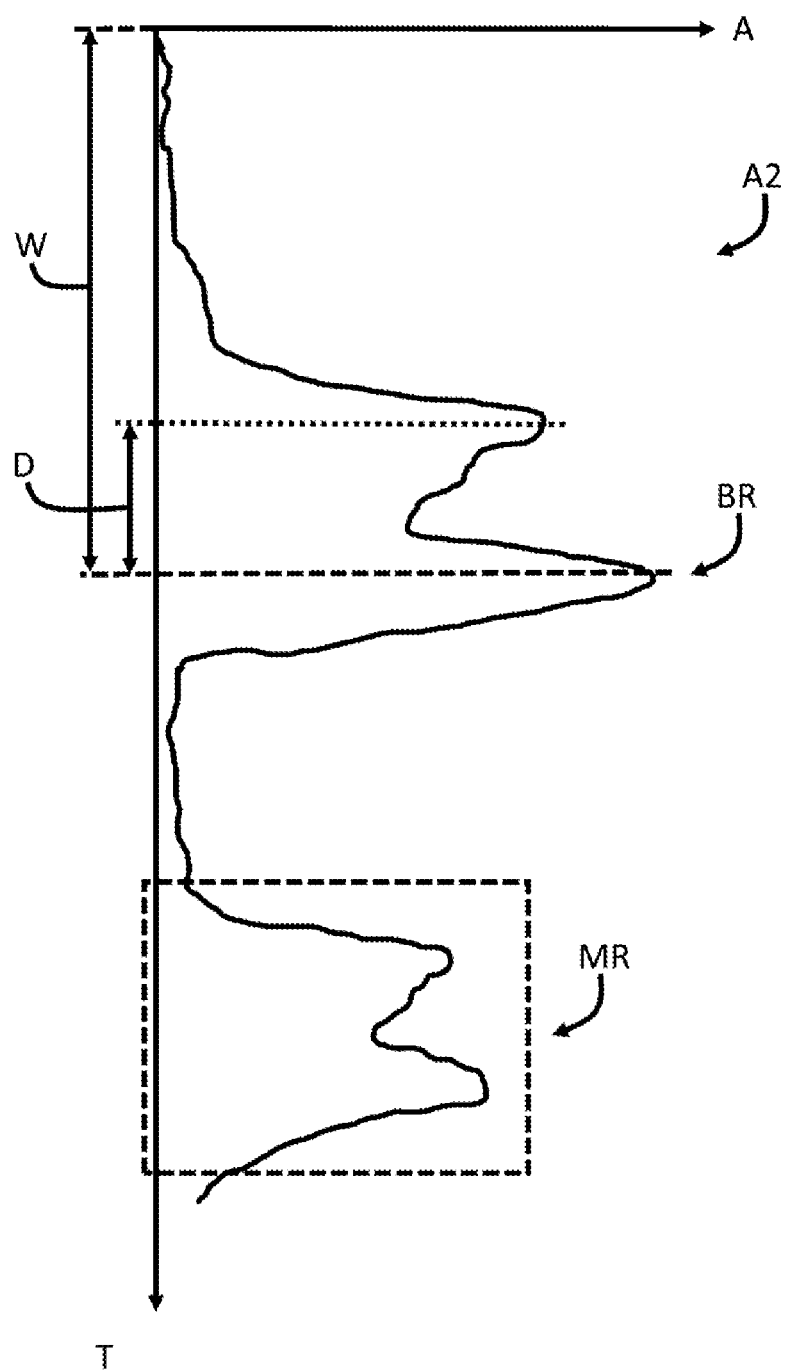
FIG. 4 shows a schematic representation of a second signal response detected by an interface sensor according to the present disclosure.

FIG. 4 shows a schematic representation of a second signal response A2 detected by the sound detector 12. The second signal response A2 has a greater amplitude as compared to the first signal response A1 at the interface between the low-viscosity measurement medium 2 and the high-viscosity measurement medium 2, that is to say the sediment layer 3, because the high-frequency second acoustic signal S2 is reflected more strongly at the sediment layer 3 in the measurement medium 2, and is absorbed more strongly by this, than the first acoustic signal S1. Here too, a repetition can be seen of the signal components which can be detected chronologically before the point in time which corresponds to the container floor (dashed-line frames with a detail of a multiple reflection MR). This repetition of the signal components of the first signal response A1 is based on a reflection of the second acoustic signal at the water surface, as described in relation to FIG. 3.

Figure 5:
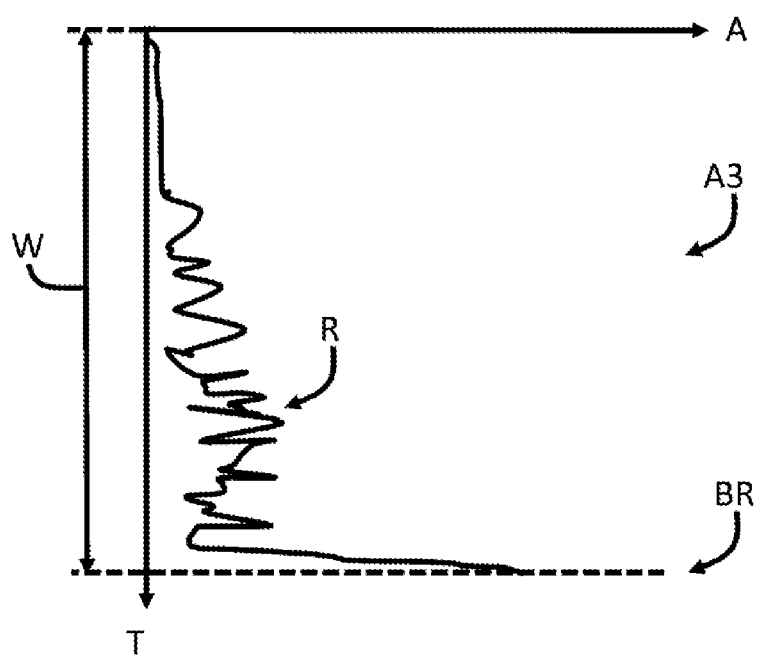
FIG. 5 shows a schematic representation of a third signal response detected by an interface sensor according to the present disclosure.

FIG. 5 shows a schematic representation of a third signal response A3 detected by the sound detector 12. The third signal response A3 is characterized by a signal region with noise component R. The acoustic signal forming the basis of the third signal response A3 is the first acoustic signal S1 and/or second acoustic signal S2. This third signal response A3 will, for example, be detected by the sound detector 12 in the event that a gas is admitted into the container 20, as is so in a "sequencing batch reactor." The control unit 13 is configured for detecting the presence of gas in the measurement medium 2 upon detection of a noise component R. An identification of the current operating mode of the sedimentation plant 1 can thus be detected or checked via the interface sensor 10.

The control unit 13 is configured for evaluating the first signal response A1, the second signal response A2, and the third signal response A3. The control unit 13 has, for example, a memory 15 (see e.g., FIG. 2). The control unit 13 is thus configured for storing the detected signal responses, for example. Reference signals, e.g., signal responses that are to be expected, may be stored in the memory 15, with which reference signals the detected signal responses can be compared by the control unit 13. Sound velocities for different measurement media are also stored in the memory 15, for example.

The control unit 13 can also be equipped with a communication module 16, for example, a wireless or wired communication module 16, to assume the role of the automatic control unit 25 (see FIG. 2). In such embodiment, no automatic control unit 25 is necessary because the inlet valve 22, the drain valve 24 and, if present, the gas inlet valve 27 are controlled by the control unit 13.

The control unit 13 and the automatic control unit 25 may be configured to perform certain operations comprising a control structure to provide the functions described herein. In certain embodiments, the control unit 13 and the automatic control unit 25 may form at least portions of a processing subsystem that includes one or more computing devices having memory, processing, and/or communication hardware. The control unit 13 may be a single device or a distributed device, and the functions of the control unit 13 may be performed by hardware and/or software, as may the automatic control unit 25. The control unit 13 and the automatic control unit 25 can include one or more arithmetic logic units (ALUs), central processing units (CPUs), memories, limiters, conditioners, filters, format converters, or the like which are not shown to preserve clarity. In at least one embodiment, the control unit 13 and the automatic control unit 25 are programmable to execute algorithms and process data in accordance with operating logic that is defined by programming instructions, such as software or firmware. Alternatively or additionally, operating logic for the control unit 13 and the automatic control unit 25 can be at least partially defined by hardwired logic or other hardware, for example, using an application-specific integrated circuit (ASIC) of any suitable type. The control unit 13 and the automatic control unit 25 can be exclusively dedicated to the functions described herein or may be further used in the regulation, control, and activation of one or more other subsystems or aspects of the interface sensor 10 and/or the sedimentation plant 1.

The operating method of the interface sensor 10 is discussed in detail below. In a first step, the interface sensor 10 is arranged in the container 20. The arrangement comprises a fixed or moveable arrangement in the container 20, in particular in the measurement medium 2. The interface sensor 10 is, for example, fastened to the container 20, in particular by means of the holder 14, such that the interface sensor 10 is in contact with the measurement medium 2. The interface sensor 10 is oriented in the direction of the floor of the container 20, e.g., in the direction of a possible sediment layer 3.

The container 20 is filled with the measurement medium 2 before, during or after the attachment of the interface sensor 10 to the container 20.

The first acoustic signal S1 is then emitted by the sound emitter 11 at a first frequency. As stated above, the first acoustic signal S1 is a low-frequency signal. The first acoustic signal S1 is thus reflected or absorbed only slightly at the measurement medium 2 or at a sediment layer 3. The first acoustic signal S1 is therefore primarily reflected at the floor of the container 20.

The first signal response A1 of the first acoustic signal S1 is then detected by the sound detector 12. The control unit 13 stores the first signal response A1, for example, in the memory 15, to later perform an evaluation of the first signal response A1. Of course, the first signal response A1 can also be evaluated immediately.

Next, an emission of the second acoustic signal S2 by the sound emitter 11 occurs at a second frequency different from the first frequency of the first acoustic signal S1. As stated above, the second frequency is a high frequency. The second acoustic signal S2 is thus reflected or absorbed at the sediment layer 3.

The detection of the second signal response A2 of the second acoustic signal S2 by the sound detector 12 then occurs. The control unit 13 stores the second signal response A2, for example, in the memory 15, to perform an evaluation later. Of course, the second signal response A2 can also be evaluated immediately. Of course, the second acoustic signal S2 can also be emitted and detected first, and then the first acoustic signal S1 can be emitted and detected.

The aforementioned method steps can also occur in a different sequence or simultaneously, insofar as this is technically possible.

In a further step, the first signal response A1 and the second signal response A2 are evaluated by the control unit 13. The control unit 13 hereby performs, for example, a subtraction of the first signal response A1 from the second signal response A2. In an alternative embodiment which is compatible with the one previously mentioned, the control unit 13 implements a frequency filtering, for example, high-pass filtering or low-pass filtering, with addition of the two signal responses. According to an alternative embodiment, the evaluation of the signal responses A1, A2 occurs, for example, by means of a Fourier transform, e.g., by means of fast Fourier transform (FFT). The signal responses A1, A2 are thereby respectively subdivided in the time domain, thus distributed over the tank depth, into numerous small segments which in turn are transformed into the frequency domain by means of FFT. In the frequency domain, the "intensity" of discrete frequencies is then investigated (e.g., 100 kHz and 675 kHz).

In a subsequent step, the control unit 13 determines a floor distance BA between the interface sensor and the container floor of the container 20. During this step or after this step, the control unit determines a sediment distance SA between the interface sensor 10 and the sediment layer 3.

The floor distance BA of the interface sensor 10 is the distance between the sound emitter 11 or sound detector 12 and the floor of the container 20, e.g., where the sediment layer 3 deposits. In determining the floor distance BA, the transit time after which the first acoustic signal S1 arrived at the container floor is determined. For this purpose, the signal amplitude of the first signal response A1, which thus was generated by the low-frequency first acoustic signal S1, is examined for a maximum. Based on this transit time up to the maximum and the known sound velocity in the measurement medium, the depth of the container floor is determined (represented by a dashed line in FIGS. 3, 4 and 5).

The sediment distance SA of the interface sensor 10 is the distance between the sound emitter 11 or sound detector 12 and the beginning of the sediment layer 3 of the measurement medium 2 (represented by a dotted horizontal line in FIGS. 3 and 4). The beginning of the sediment layer 3 is potentially an interface between liquid measurement medium 2 and solid or viscous measurement medium 2. To determine the sediment distance SA, the transit time is determined after which the signal amplitude of the second signal response A2, thus which was generated by the second acoustic signal S2, is greatest. For example, for this purpose a region of the second acoustic signal S2, e.g., the region in which the floor of the container 20 is located, is masked out.

In a next step, the control unit 13 determines the sediment thickness D exhibited by the sediment layer 3 of the measurement medium 2. For example, for this purpose the sediment distance SA is subtracted from the floor distance BA.

In a further step, the sediment thickness D is output by the control unit 13. This output can occur, for example, by means of communication of the sediment thickness D to a control center or to a field device. Furthermore, the control unit 13 is configured for forwarding all received and evaluated information to a control center, or to a field device, or to a mobile control device. All information can of course also be stored in the memory 15 of the control unit 13.

In a further optional step, a water level distance WA of the interface sensor 10 is performed by the control unit 13 on the basis of the step of evaluating the first signal response A1 and the second signal response A2.

For this purpose, the evaluation range of the signal responses A1 and A2 is expanded, and simple reflections as well as multiple reflections between the interfaces are analyzed in terms of their intensity, their temporal sequence and their differences/deviations. Given the first signal response A1, a direct reflection of the previously recorded floor echo at the water surface can thereby be measured. In FIG. 3, this direct reflection, i.e., a second floor reflection of the first acoustic signal S2, is shown by the dashed-line frame (second signal maximum in the framed signal portion). Multiple reflections between the interface to be detected and the water surface can be measured with both the signal response A1 and A2. Since the main echo has a first transit time from the sensor to the interface, and the multiple reflection is extended by a second transit time due to the depth of immersion of the interface sensor 10 in the measurement medium 2, the immersion depth can be determined by comparing the first and second transit times.

This is preferably followed by a step of the determination of a water level W by the control unit 13 on the basis of the floor distance BA and the water level distance WA. For this purpose, for example, the floor distance BA and the water level distance WA are added. After the determination, the water level W may be output to a field device or other device. The water level W may also be stored in the memory 15 of the control unit 13.

An automatic control method of the sedimentation plant 1 is described below. In a first step, the sedimentation plant 1 is provided. The sedimentation plant 1 is, for example, part of a sewage treatment plant with a plurality of containers or basins that fulfill different functions. In this instance, further basins are arranged, for example, upstream and downstream of the container 20, e.g., of the sedimentation plant 1.

In any event, the sedimentation plant 1 according to this automatic control method has at least the inlet valve 22 and drain valve 24 described above.

If the sedimentation plant 1 is, for example, what is known as a "sequencing batch reactor," there are generally no containers arranged upstream or downstream.

In a further step, the interface sensor 10 is operated according to one of the embodiments described above, or according to a combination of the described embodiments according to one of the operating methods described above or a combination of the operating methods described above.

Next, the inlet valve 22 and the drain valve 24 are regulated depending on the water level WA and/or floor distance BA or water level W, determined by the interface sensor 10. For example, the water level W is hereby determined by the interface sensor 10 at regular intervals and the drain valve 24 is opened as soon as the water level W has exceeded an upper limit value, and/or the inlet valve 22 is opened as soon as the water level W has fallen below a lower limit value. Of course, other types of regulation are also possible.

In an optional step that is compatible with the aforementioned, in particular if the sedimentation plant 1 is a "sequencing batch reactor," the automatic control method includes a step of treating of the measurement medium with gas 2 by means of the gas inlet valve 27. The gas inlet valve 27 is hereby opened, for example after a prespecified time period, or the gas inlet valve 27 is opened upon achieving a prespecified sediment thickness D and/or upon achieving a prespecified water level W. The gas treatment may also occur, for example, after or upon admitting measurement medium 2.

In a further optional step that is compatible with the aforementioned steps, the current operating state of the sedimentation plant 1 is determined and output by the control unit 13. The first signal response A1 and/or the second signal response A2, or the third signal response A3, are thereby evaluated. For example, if a noise R is discovered in the signal response, the sedimentation plant 1 may currently be in a gas treatment phase. Depending on size, the gas bubbles ascending in the container 20 may exhibit a different, frequency-dependent reflection behavior, which can be recognized via the signal evaluation.

Due to the frequency-dependent reflection and transmission properties, the control unit 13 of the interface sensor 10 can recognize the gas bubbles and their size and adapt the frequency of the acoustic signals S1, S2 such that an influencing of the measured values (e.g., interface, container floor, water surface) is prevented. If the gas quantity is so low or the gas bubbles are very small, such that acoustic signals in the measurement medium 2 still reach the floor of the container 20, "jumping" interface measurement values may be measured (see FIG. 5) because the gas bubbles reflect the acoustic signal very strongly. Given a large amount of gas, or large gas bubbles, such that acoustic signals no longer reach the floor of the container 20 or deep regions of the container 20, a sound echo may no longer be received by the sound detector 12. This operating state evaluation thus contributes to a more robust measurement. The operating state in the container can be detected by the presence and characteristic of the air bubbles (e.g., aeration in the sequencing batch reactor). The automatic control method can react to these operating states.

We claim:
1. An operating method for an interface sensor, the method comprising:

arranging an interface sensor, which comprises a sound emitter, a sound detector and a control unit, at least partially in a container that is filled with a measurement medium such that the interface sensor is in contact with the measurement medium, wherein the interface sensor is aligned in a direction of a sediment layer in the container;

emitting via the sound emitter a first acoustic signal including a first frequency;

detecting via the sound detector a first signal response resulting from the first acoustic signal;

emitting via the sound emitter a second acoustic signal including a second frequency different from the first frequency;

detecting via the sound detector a second signal response resulting from the second acoustic signal;

evaluating the first signal response and the second signal response;

determining a floor distance and a sediment distance of the interface sensor based on the evaluating of the first signal response and the second signal response;

determining a sediment thickness based on the floor distance and the sediment distance;

determining whether the container is operating in a gas treatment phase based on the evaluating of the first acoustic signal response and/or the second acoustic signal response; and outputting the sediment thickness, wherein the evaluating, determining, and outputting are performed via the control unit.

2. The method of claim 1, wherein the evaluating of the first signal response and the second signal response comprises a subtraction of the first signal response from the second signal response, and/or a low-pass filtering and an addition of the first signal response and the second signal response.

3. The method of claim 1, wherein the determining of the sediment thickness comprises a subtraction of the determined sediment distance from the determined floor distance.

4. The method of claim 1, further comprising:
determining a water level distance of the interface sensor based on the evaluating of the first signal response and of the second signal response;
determining a water level based on the floor distance and the water level distance; and
outputting the water level.

5. The method of claim 4, wherein the determining of the water level distance comprises a subtraction of the first signal response and the second signal response.

6. The method of claim 1, wherein the determining of operating in the gas treatment phase comprises an evaluation of a gas quantity of gas bubbles in the measurement medium based on the first signal response and/or the second signal response.

7. An interface sensor for a sedimentation plant, the interface sensor comprising:
a sound emitter configured to generate at least one first acoustic signal including a first frequency and to generate a second acoustic signal including a second frequency different from the first frequency;
a sound detector configured to detect at least one first signal response resulting from the at least one first acoustic signal and to detect a second signal response resulting from the second acoustic signal; and
a sensor control unit, wherein the sensor control unit is connected to the sound emitter and the sound detector and is configured to operate upon the at least one first signal response and the second signal response, wherein the sensor control unit is configured to operate upon the at least one first signal response and the second signal response to determine whether the sedimentation plant is operating in a gas treatment phase, and wherein the interface sensor is configured to be immersed in a measurement medium.

8. The interface sensor of claim 7, wherein the sensor control unit is further configured to determine a floor distance, a sediment distance, and a sediment thickness based on the at least one first signal response and the second signal response.

9. A sedimentation plant, comprising:
the interface sensor according to claim 7;
a container configured to receive a measurement medium, wherein the interface sensor is arranged relative to the container such that the interface sensor is immersible in the measurement medium;
a measurement medium inlet configured to fill the container with the measurement medium; and
a measurement medium outlet configured to discharge the measurement medium from the container.

10. The sedimentation plant according to claim 9, wherein the measurement medium inlet includes an inlet valve, and the measurement medium outlet includes a drain valve,
the sedimentation plant further comprising an automatic control unit, which is connected to the inlet valve, the drain valve and the sensor control unit of the interface sensor, the automatic control unit configured to control filling and emptying of the container with the measurement medium.

11. The sedimentation plant according to claim 10, wherein the sedimentation plant further comprises a gas inlet, including a gas inlet valve, configured for treating the measurement medium with gas, wherein the automatic control unit is connected to the gas inlet valve and is configured for regulating the treating of the measurement medium with the gas.

12. The interface sensor of claim 7, wherein the determining of operating in the gas treatment phase comprises an evaluation of a gas quantity of gas bubbles in the measurement medium based on the at least one first signal response and/or the second signal response.

13. An automatic control method for a sedimentation plant, the method comprising:
providing a sedimentation plant, comprising:
an interface sensor configured to be immersed in a medium, the interface sensor comprising:
a sound emitter configured to generate at least one first acoustic signal including a first frequency and to generate a second acoustic signal including a second frequency different from the first frequency;
a sound detector configured to detect at least one first signal response resulting from the at least one first acoustic signal and to detect a second signal response resulting from the second acoustic signal; and
a sensor control unit, wherein the sensor control unit is connected to the sound emitter and the sound detector and is configured to operate upon the at least one first signal response and the second signal response,
wherein the sensor control unit is configured to operate upon the at least one first signal response and the second signal response to determine whether the sedimentation plant is operating in a gas treatment phase;

a container configured to receive a measurement medium, wherein the interface sensor is arranged relative to the container such that the interface sensor is immersible in the measurement medium;

a measurement medium inlet, including an inlet valve, configured to fill the container with the measurement medium;

a measurement medium outlet, including a drain valve, configured to discharge the measurement medium from the container; and an automatic control unit, which is connected to the inlet valve, the drain valve, and the sensor control unit of the interface sensor, the automatic control unit configured to control filling and emptying of the container with the measurement medium;

operating the interface sensor according to claim 4; and regulating the inlet valve and the drain valve based on the water level determined by the interface sensor.

14. The automatic control method of claim 13, wherein the sedimentation plant further comprises a gas inlet, including a gas inlet valve, configured for the treating of the measurement medium with gas, wherein the automatic control unit is connected to the gas inlet valve and is configured for regulating the treating of the measurement medium with gas, the automatic control method further comprising treating of the measurement medium with the gas via the gas inlet valve, wherein the treating of the measurement medium is performed based the on the sediment thickness and/or the water level.

15. The automatic control method of claim 13, wherein the determining of operating in the gas treatment phase comprises an evaluation of a gas quantity of gas bubbles in the measurement medium based on the at least one first signal response and/or the second signal response.

\* \* \* \* \*